United States Patent [19]
Holden

[11] Patent Number: 5,687,907
[45] Date of Patent: Nov. 18, 1997

[54] YAW AND PITCH THRUST VECTORING NOZZLE

[75] Inventor: Davis C. Holden, Pensacola, Fla.

[73] Assignee: United Technologies Corporation, Hartford, Conn.

[21] Appl. No.: 375,212

[22] Filed: Jul. 3, 1989

Related U.S. Application Data

[63] Continuation-in-part of Ser. No. 135,130, Dec. 18, 1987, abandoned.

[51] Int. Cl.⁶ .................................................. B64C 9/38
[52] U.S. Cl. ........................ 239/265.35; 239/265.37; 60/230
[58] Field of Search ............................ 60/226.1, 228, 60/230; 244/12.4; 239/265.19, 265.25, 265.27, 265.35, 265.41

[56] References Cited

U.S. PATENT DOCUMENTS

| | | | |
|---|---|---|---|
| 3,601,992 | 8/1971 | Maison | 60/226.1 |
| 3,739,582 | 6/1973 | Maison | 60/226 |
| 4,274,593 | 6/1981 | Joubert | 239/265.35 |
| 4,605,169 | 8/1986 | Mayers | 239/265.29 |
| 4,641,782 | 2/1987 | Woodward | 239/265.24 |

*Primary Examiner*—Andres Kashnikow
*Assistant Examiner*—Kevin P. Weldon

[57] ABSTRACT

An exhaust nozzle (12) for providing both yaw and pitch thrust vectoring includes an upper flap assembly (18) and a lower flap assembly (20). Each flap assembly (18, 20) includes a forward stub flap (51, 53) with lateral hinges (32, 34) and a plurality of individual flap sections (52) extending longitudinally downstream and adjacently engaged for defining the upper and lower gas flow boundaries. The forward end of each flap section (52) is pivoted vertically (54) in the same plane as vertical sidewall hinges (48, 50). Yaw thrust vectoring is achieved by pivoting the sections (52) and sidewalls (22, 24), while pitch thrust vectoring is achieved by moving the flap assemblies (18, 20) about the respective forward hinges (32, 34).

3 Claims, 2 Drawing Sheets

5,687,907

YAW AND PITCH THRUST VECTORING NOZZLE

This application is a continuation-in-part of U.S. patent application titled "Yaw and Pitch Thrust Vectoring Nozzle" filed Dec. 18, 1987, Ser. No. 07/135,130 now abandoned.

FIELD OF THE INVENTION

The present invention relates to an exhaust nozzle for a gas turbine engine.

BACKGROUND

Thrust vectoring exhaust nozzle arrangements for gas turbine engines in aircraft applications are well known in the art. One particular arrangement, wherein the gas discharge outlet is defined by a pair of fixed, laterally spaced apart sidewalls and opposing upper and lower movable flaps, provides an effective apparatus for achieving single plane thrust vectoring with a minimum of moving parts and complexity. One example of such an arrangement is disclosed in U.S. Pat. No. 4,641,782.

Multiplane, i.e., yaw and pitch, thrust vectoring nozzle arrangements known in the prior art are significantly more complicated than the single plane arrangement described above. Such complexity adds to the weight of multiplane designs, forcing potential users to choose between the highly flexible multiplane thrust vectoring capability and the lightweight, simple single plane arrangement.

As will be apparent to those familiar with thrust vectoring exhaust nozzles and aircraft applications thereof, a practical multiplane thrust vectoring exhaust nozzle would dramatically increase the high speed maneuverability of an aircraft so equipped. Such a practical design would provide for selectably directing the discharge direction of the turbine exhaust gas while employing a minimum number of moving parts and associated actuators.

SUMMARY OF THE INVENTION

It is therefore an object of the present invention to provide a yaw and pitch thrust vectoring outlet duct for an exhaust nozzle for a gas turbine engine or the like.

It is further an object of the present invention to provide a two dimensional outlet duct having a rectangular gas flow area defined within a laterally spaced pair of movable sidewalls and upper and lower flap assemblies.

According to the present invention, an exhaust nozzle receiving a flow of high velocity gas from a gas turbine engine is provided with an outlet duct having movable vertical sidewalls and movable upper and lower flap assemblies for selectably directing the discharged exhaust gas, thereby achieving selectably vectored nozzle thrust. The sidewalls are hinged vertically at the upstream edges thereof and move in unison for directing the exhaust gas in the horizontal plane for developing yaw thrust with respect to the nozzle centerline.

The upper and lower flap assemblies extend laterally between the sidewalls, each assembly including a plurality of individual flap sections. Each section has a vertical pivot at the upstream end thereof and is slidingly engaged with adjacent flap sections for defining a substantially planar gas boundary. The vertical pivots permit rotation of the individual sections in unison with the sidewalls while the sliding engagement allows longitudinal displacement between adjacent flap sections without interrupting the gas boundary.

The upper and lower flap assemblies each further include an upstream hinge secured to the nozzle and oriented laterally with respect to the exhaust gas flow. These hinges provide for collective rotation of the upper and lower flap assemblies independent of each other and the duct sidewalls, thereby directing the discharged gases in the vertical plane for achieving pitch thrust vectoring.

The assemblies may also be oriented so as to define divergent, convergent and/or uniform gas flow area along the outlet duct, thus optimizing the exhaust path for maximum engine thrust and efficiency. Both these and other objects and advantages of the outlet duct according to the present invention will be apparent to those skilled in the art following a review of the following specification and the appended claims and drawing figures.

DETAILED DESCRIPTION OF THE PREFERRED EMBODIMENT

Figure 1:
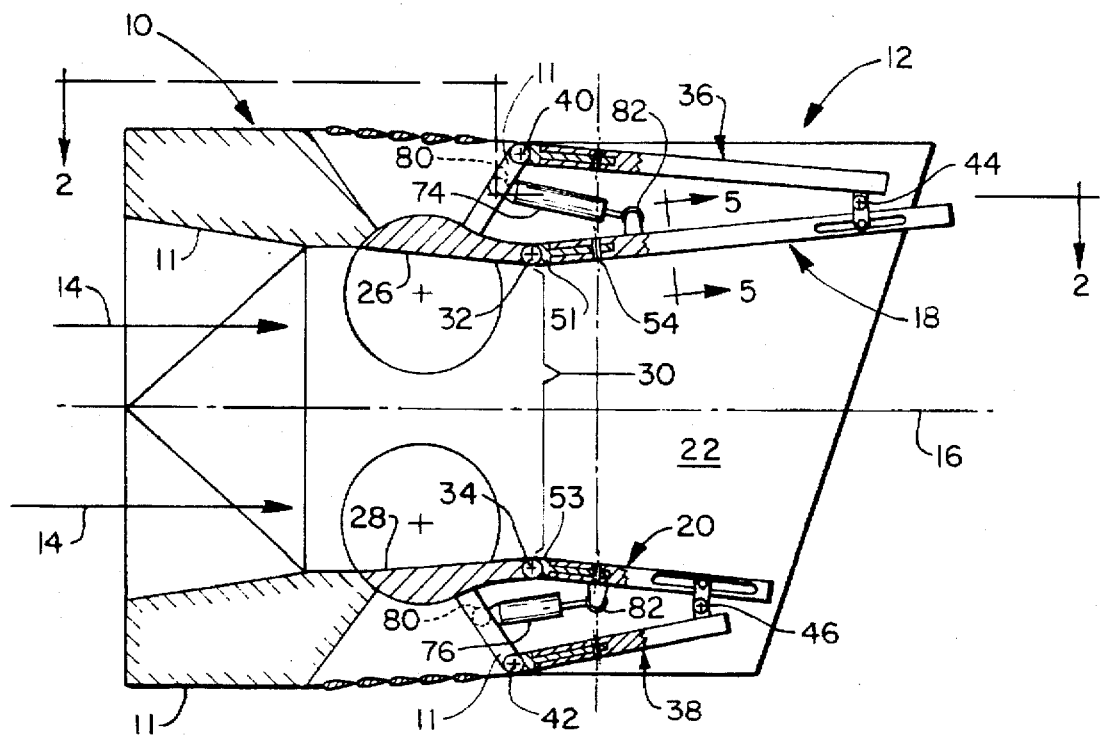
FIG. 1 shows a vertical cross section taken through the nozzle centerline of a nozzle and outlet duct according to the present invention.

FIG. 1 shows a vertical cross section of a variable area nozzle 10 having a movable outlet duct 12 according to the present invention secured downstream. The nozzle 10 receives a flow of high velocity gas turbine engine exhaust gases 14 which flow generally rearwardly parallel to the nozzle axis 16. The outlet duct includes an upper flap assembly 18, a lower flap assembly 20 which extend laterally with respect to the gas flow 14 between first and second spaced apart sidewalls 22, 24. The nozzle 10 shown in FIG. 1 is a two dimensional, variable area configuration wherein upper and lower convergent flaps 26, 28 are movable into the stream of exhaust gas 14 so as to define a variable throat dimension 30, and hence a variable throat area.

Upper and lower flap assemblies 18, 20 are each hinged at the upstream edge thereof to the nozzle 10 by respective hinge joints 32, 34. The upper and lower flap assemblies are each thus rotatable collectively about the respective hinges for defining selectably movable upper and lower gas boundaries. Upper and lower external fairing flap assemblies 36, 38 are also hinged 40, 42 at the upstream edges thereof and are slidably engaged at the downstream edges thereof to the flap assemblies by respective cam and race arrangements 44, 46 as shown in FIG. 1. The external fairing flaps 36, 38 thus follow the movement of the upper and lower flap assemblies 18, 20 for achieving a smooth exterior surface for aerodynamic efficiency.

Figure 2:
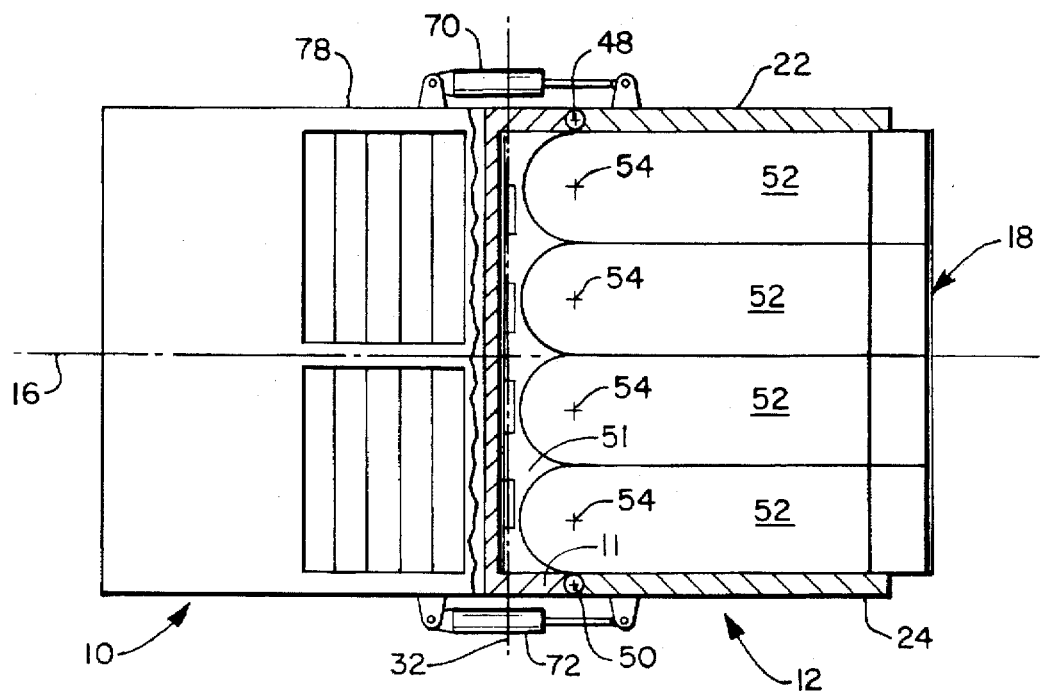
FIG. 2 shows a view of the upper flap assembly of the outlet duct according to the present invention as indicated in FIG. 1.
Figure 3:
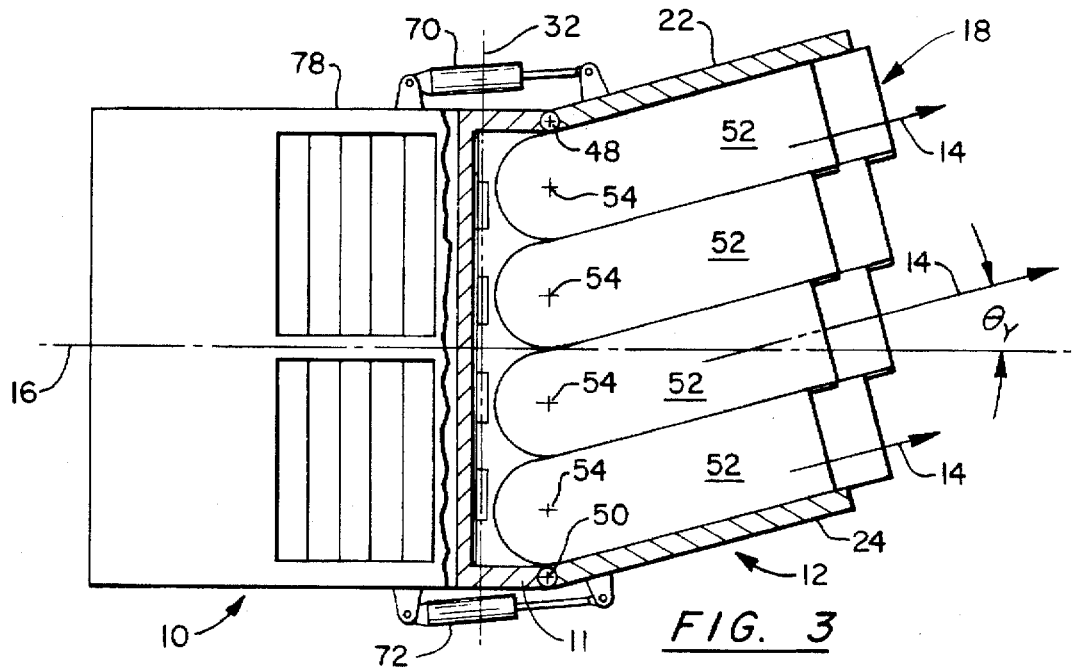
FIG. 3 is a view of the upper flap assembly configured so as to direct the exhaust gases at an angle with respect to the nozzle centerline in the horizontal plane.

FIG. 2 shows a view of the upper flap assembly 18 taken in a horizontal plane as shown in FIG. 1. The upstream hinged joint 32 of the upper flap assembly 18 is illustrated between the nozzle 10 and the duct 12. Nozzle sidewalls 22, 24 are shown defining the lateral boundaries of the outlet duct 12 and each include a vertical hinge 48, 50 at the upstream edge thereof. The upper flap assembly 18 includes an upstream stub flap 51 and a plurality of downstream extending individual flap sections which are arranged adjacently between the sidewalls 22, 24 so as to define a generally planar surface. Each flap section 52 includes a vertical pivot 54 at the upstream end thereof for permitting rotation of the flap section 52 in the horizontal plane relative to the stub flap 51. The individual flap section pivot joints 54 are generally located in a plane defined by the vertical sidewall hinges 48, 50 and the flap sections 52 and sidewalls 22, 24 are rotatable in unison in the horizontal plane as shown in FIG. 3. The general structure of the upper flap assembly 18 i.e. a stub flap hinged laterally at the upstream edge and having a plurality of adjacent flap sections extending downstream from a vertical pivot disposed in the stub flap, is repeated in the lower flap assembly 20 as well as in the upper and lower external fairing flap assemblies 36, 38.

FIG. 3 shows the outlet duct according to the present invention in a yaw pitch thrust vectoring configuration wherein the sidewalls 22, 24 have been rotated, along with the individual flap sections 52, so as to define an outlet duct 18 skewed with respect to the nozzle centerline 16. The individual flap sections 52 are slidably engaged with each adjacent flap section and/or sidewall 22, 24 and slip longitudinally with respect thereto, thereby maintaining the upper gas boundary during such collective rotation. The engine exhaust gases 14 are thus directed at an angle $\Theta_y$ with respect to the centerline for providing a vectored yaw thrust as desired.

Figure 4:
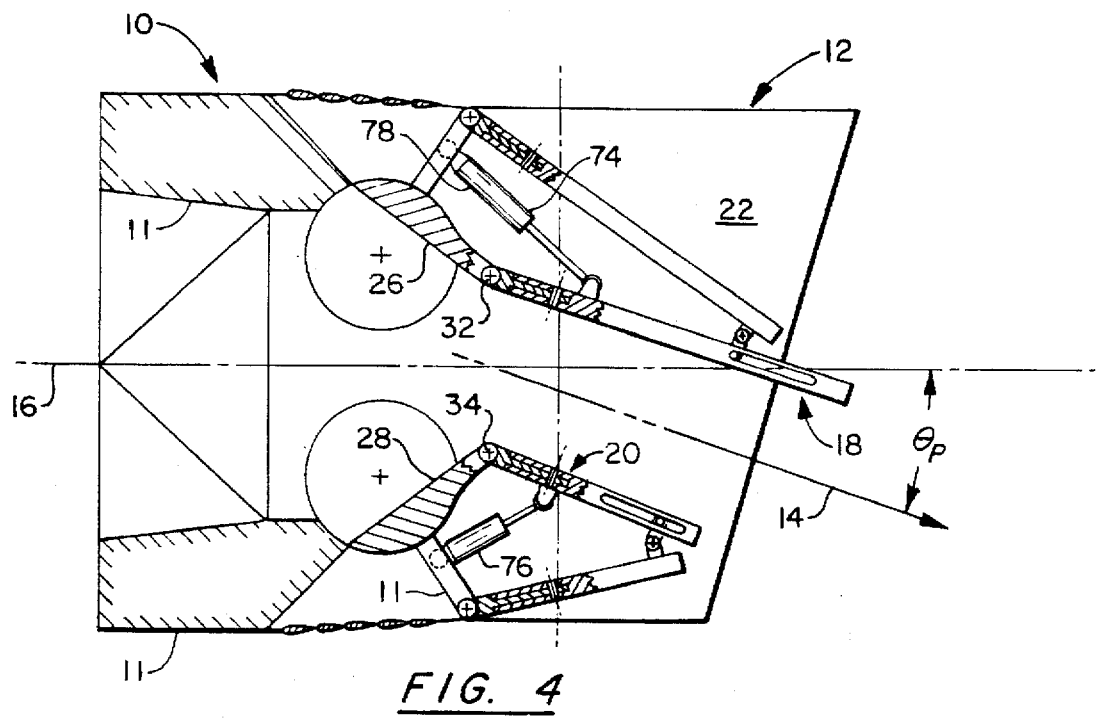
FIG. 4 shows the nozzle and outlet duct according to the present invention configured so as to deliver downward pitch thrust.

Pitch thrust vectoring is achieved in the outlet duct according to the present invention by rotating the upper and lower flap assemblies 18, 20 about their respective lateral hinges 32, 34 in the stub flaps 51, 53 thus redirecting the exhaust gas 14 in the vertical plane at an angle $\Theta_p$ with respect to the nozzle centerline 16 as shown in FIG. 4.

During operation of the nozzle and outlet duct according to the present invention, the sidewalls 22, 24 and upper and lower flap assemblies 18, 20 are positioned as desired to achieve the required degree of yaw and/or pitch thrust vectoring for maneuver or other purposes. The upper and lower lateral hinges 32, 34 permit the upper and lower flap assemblies 18, 20 to be rotated collectively and independently, thereby being configured so as to define a neutral thrust configuration as in FIG. 1, or a vectored thrust configuration as in FIG. 4. It will also be appreciated by those skilled in the art that the individual assemblies 18, 20 may be positioned so as to define an increasing or decreasing flow area outlet duct 12 for achieving a variety of outlet duct pressure and velocity distributions in response to engine operating and environment parameters.

Such flexibility is particularly desirable in high performance aircraft applications wherein top engine thrust and efficient operation must be achieved. The independently movable convergent flaps 26, 28 and flap assemblies 18, 20 permit full control of the nozzle thrust 30, as well as the variation in flow area in the outlet duct 12, over the entire range of yaw and pitch thrust vectored operation. This full control results in optimum nozzle thrust production, minimizing the magnitude of the yaw and pitch angles $\Theta_y$ and $\Theta_p$ necessary to deliver a given resultant thrust and reducing the required range of motion of the movable nozzle components, thereby simplifying the mechanical design of the individual components.

Yaw thrust vectoring is achieved by rotating the laterally spaced apart sidewalls 22, 24 as well as the individual flap sections 52 disposed therebetween about their respective hinge joints 48, 50 and vertical pivots 54. Unlike prior art multidimensional thrust vectoring nozzles wherein the upstream portion of the outlet duct rotates monolithicly with respect to the fixed nozzle, the plurality of adjacent, pivoted flap sections permits the outlet duct according to the present invention to direct the exhaust gases in the horizontal plane without complicated seals or actuation linkage. The individual adjacent flap sections are cooperatively engaged by a variety of methods which provide both structural and gas boundary integrity.

The flap assemblies 18, 20 and sidewalls 22, 24 are positioned by actuators 70, 72, 74, 76 shown schematically in FIGS. 3 and 4. Each linear actuator 70, 72, 74, 76 is disposed between the nozzle static structure and the corresponding movable flap component 22, 24, 18, 20. Upper and lower flap assembly actuators 74, 76 may further include ball joint mountings 80, 82 for permitting rotation of the flap sections 52 about the corresponding vertical pivots 54. The flap and sidewall movements are coordinated in response to the required yaw and pitch thrust vector, as well as the engine operating conditions and thrust level. It should further be noted that mechanical failure of the actuators or associated linkages results in nozzle configurations which deliver unvectored thrust providing the nozzle according to the present invention with a fail-safe capability.

Figure 5:
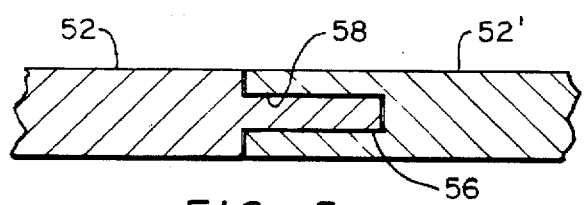
FIG. 5 shows a detailed cross section of two adjacent flap sections in the upper flap assembly as indicated in FIG. 1.

FIG. 5 shows one such engagement design having a tongue member 56 which is received laterally within a groove opening 58 in an adjacent flap section 52'.

The present invention is thus well suited for providing an outlet duct arrangement for selectably directing the flow of exhaust gases for achieving multidimensional thrust vectoring.

I claim:

1. A movable outlet duct for a thrust vectoring exhaust nozzle, comprising:
   first and second laterally spaced, vertical sidewalls, each sidewall pivotable about a vertical hinge secured to the nozzle and extending downstream therefrom;
   an upper flap assembly disposed between the sidewalls, including:
     a laterally extending upper stub flap,
     a plurality of flap sections each extending parallel to the gas flow and disposed adjacently between the sidewalls, each pair of adjacent flap sections having a linear sliding seal joint therebetween, the flap sections and upper stub flap collectively defining a planar upper gas boundary of the outlet duct,
     each flap section further including a vertical pivot joint adjacent the upstream end thereof, each pivot joint being secured downstream of the laterally extending upper stub flap disposed between the flap sections and the nozzle, the upper stub flap further including a lateral hinge at the upstream edge thereof secured to the nozzle, whereby the upper flap assembly is collectively movable about the laterally extending hinge and whereby the individual flap sections are movable in unison about the corresponding vertical pivot joints thereby achieving both vertical and lateral movement of the outlet duct.

2. A movable outlet duct as recited in claim 1, further comprising:
   a lower flap assembly including a laterally extending lower stub flap, a plurality of flap sections each extending parallel to the gas flow and disposed adjacently between the sidewalls, each pair of adjacent flap sections having a linearly sliding seal joint therebetween, the flap sections and lower stub flaps collectively defining a planar lower gas boundary of the outlet duct, each flap section further including a vertical pivot joint adjacent the upstream end thereof, each pivot joint being secured downstream of the laterally extending lower stub flap disposed between the flap sections and the nozzle, the lower stub flap further including a lateral hinge at the upstream edge thereof secured to the nozzle, whereby the lower flap assembly is collectively movable about the laterally extending hinge and whereby the individual flap sections are movable in unison about the corresponding vertical pivot joints thereby achieving both vertical and lateral movement of the outlet duct.

3. The movable outlet duct as recited in claim 2, wherein the nozzle includes upper and lower convergent flaps extending laterally with respect to the gas flow, each convergent flap having a leading edge and a trailing edge, the convergent flaps being selectably movable within the nozzle for defining a variable area gas flow throat therebetween, and wherein the lateral hinge of the upper flap assembly is secured to the upper convergent flap trailing edge, and the lateral hinge of the lower flap assembly is secured to the lower convergent flap trailing edge.

\* \* \* \* \*